PROJECTION SYSTEM

Filed Nov. 4, 1964 5 Sheets-Sheet 1

INVENTORS:
HENRY J. VANDERLAAN,
MICHAEL GRASER, JR.

BY Julius J. Zaskalicky
THEIR ATTORNEY

INVENTORS:
HENRY J. VANDERLAAN,
MICHAEL GRASER, JR.

BY [signature]
THEIR ATTORNEY.

PROJECTION SYSTEM

Filed Nov. 4, 1964 5 Sheets-Sheet 3

INVENTORS:
HENRY J. VANDERLAAN,
MICHAEL GRASER, JR.

BY Julius J. Zaskalicky
THEIR ATTORNEY.

INVENTORS
HENRY J. VANDERLAAN,
MICHAEL GRASER, JR.

BY Julius J. Zaskalicky
THEIR ATTORNEY.

INVENTORS:
HENRY J. VANDERLAAN,
MICHAEL GRASER, JR.

BY Julius J. Zaskalicky
THEIR ATTORNEY.

United States Patent Office 3,385,923
Patented May 28, 1968

3,385,923

PROJECTION SYSTEM

Henry J. Vanderlaan, Liverpool, and Michael Graser, Jr., Fayetteville, N.Y., assignors to General Electric Company, a corporation of New York Filed Nov. 4, 1964, Ser. No. 408,866
7 Claims. (Cl. 178—5.4)

The present invention relates to improvements in systems for the projection of images of the kind including a viscous light modulating medium deformable into diffraction gratings by electron charge deposited thereon in accordance with electrical signals corresponding to the images and relates particularly to such systems for the projection of both color and monochrome images.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of oil in which the electron beam forms phase diffraction gratings having adjacent valleys spaced apart by a predetermined distance. Each portion of the light incident on a respective small area or point of the medium is deviated in a direction orthogonal to the direction of the valleys. The intensity of the deviated light is a function of the depth of the valleys.

The phase diffraction grating may be formed in the layer of oil by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations in the period of scan are changed in amplitude, the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of white light, which is constituted of primary color components of light is directed on a diffraction grating, light impinging therefrom is dispersed into a series of spectra on each side of a line representing the direction or path of undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelenth of red light to the line to line spacing of the grating is equal to the sine of the angle, and so on.

If the beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portions. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light in the first, second and higher diffraction orders. The apertures in a light output mask are of predetermined extent and at locations in order to selectively pass the desired orders of primary color components of the diffraction spectrum. The line to line spacing of each of the three primary diffraction gratings determines the width and location of the cooperating slot to pass the respective primary color component when a diffraction grating corresponding to that color component is formed in the light modulating medium.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green, and red, and the carrier frequency associated with each of these colors is proportionately lower, the deviation in the first order spectrum of the blue component of white light by the blue diffraction grating and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color component. Projection of such a beam reconstitutes in color the image corresponding to the electrical signals.

In a modification of the system described above and to be considered in detail herein, one set of grating lines is formed perpendicular or orthogonal to the other sets of grating lines. In such a system light filters and focusing elements direct red and blue light from a source of white light through the light modulating medium onto appropriate opaque and transparent portions of the light output mask cooperatively associated with the red and blue diffraction gratings formed in the light modulating medium to produce the desired operation explained above and direct green light from the source of white light on the common area of the light modulating medium and onto appropriate opaque and transparent portions in the light output mask which are cooperatively associated with the green diffraction grating formed in the light modulating medium. The red and blue diffraction gratings are formed by appropriate velocity modulation of the electron beam in the direction of horizontal scan. The natural grating formed by the horizontal scan of the electron beam serves as a green diffraction grating.

In such a system efficiency of light transmission and the resolution of the projected image are important requirements. Increased efficiency is obtained by providing in the light input channel of such a system a pair of lenticulated plates. One plate includes an array of spherical lenticules, each of which serve to image a source of light on a respective portion of a slot on the input mask of the system. The other plate also includes an array of spherical lenticules, each of which serves to image a respective one of the lenticules on the first mentioned plate onto the raster area of the light diffracting medium. With such an arrangement light from a small source is formed into a plurality of secondary sources each located in one of the slots. The input bar and slots arrays of the input light mask are preferably located close to the second lenticular plate. The lenticular plates are preferably sectors of concentric spherical shells, the center of which is the center of the raster area of the light diffracting medium. By proportioning the spacing of the horizontal slots of one array with respect to the spacing of the vertical slots of the other array in accordance with the aspect ratio of raster area, and similarly proportioning the horizontal and lateral dimensions of each of the lenticules on each of the lenticular plates, high efficiency and uniformity of illumination of the raster area is obtained for color projection. Correspondingly, the output mask is arranged to have a relatively large portion of the active surface area thereof open to pass light under the appropriate conditions. Such improvements are more fully described and claimed in a copending application Ser. No. 316,606, filed Oct. 16, 1963, and assigned to the assignee of the present invention.

Further improvements directed to increasing light efficiency and improving resolution are described and claimed in a copending patent application Ser. No. 365,751, filed May 7, 1964, and assigned to the assignee of the present invention. The system of the aforementioned patent application enables not only the utilization of wider opening in the input mask of such systems to allow maximum light to pass through, but also to make more extensive use of openings in the output mask to allow more of the diffracted light from the light modulating medium to pass therethrough to the screen under appropriate conditions of modulation without introducing undesired contamination in the various color channels of the system. In the embodiments of that patent application the diffraction gratings orthogonal to the lines of scan are associated with the magneta channel, and the ratio of the line to line spacing of the blue diffraction grating to the line to line spacing of the red diffraction grating is selected equal to the ratio of the dominant wavelength of the red component to the dominant wavelength of the blue component.

The present invention is directed to providing still further improvements in light efficiency and resolution in light valve projectors. In accordance with one aspect of the present invention the slots and bars of the output mask associated with the red and blue primary color channels are arranged such that alternate bars are of appreciably less width than adjacent bars. As many input slots are used as there are wide output bars. Thus essentially providing one-half as many light sources providing essentially the same total light. Successive light sources are imaged onto successive wide output bars. Correspondingly, the center to center spacing of the output bars in the green color channel are made three-fourth of the center to center spacing of the wide output bars in the red and blue primary color channels. Such a provision improves resolution in the green channel as more fully described and claimed in copending patent application Ser. No. 381,634, filed July 10, 1964, and assigned to the assignee of the present invention. Provision of such mask systems enables lenticules of twice the linear size of the lenticules utilized in the arrangement of the aforementioned patent application Ser. No. 365,751 to be employed. With such an arrangement the manufacture of the lenticular plates is simplified and the performance thereof is improved.

Accordingly, it is an object of the present invention to provide a light valve projection system of high efficiency and resolution.

It is also an object of the present invention to provide a light valve projection system in which the fabrication of the optical elements is simplified.

It is a further object to provide a light valve projection which is versatile in application.

The novel features believed characteristic of the invention are set forth in the appended claims. The invention itself, together with further objects and advantages thereof may best be understood by reference to the following description taken in connection with the accompanying drawings in which:

Figure 1:
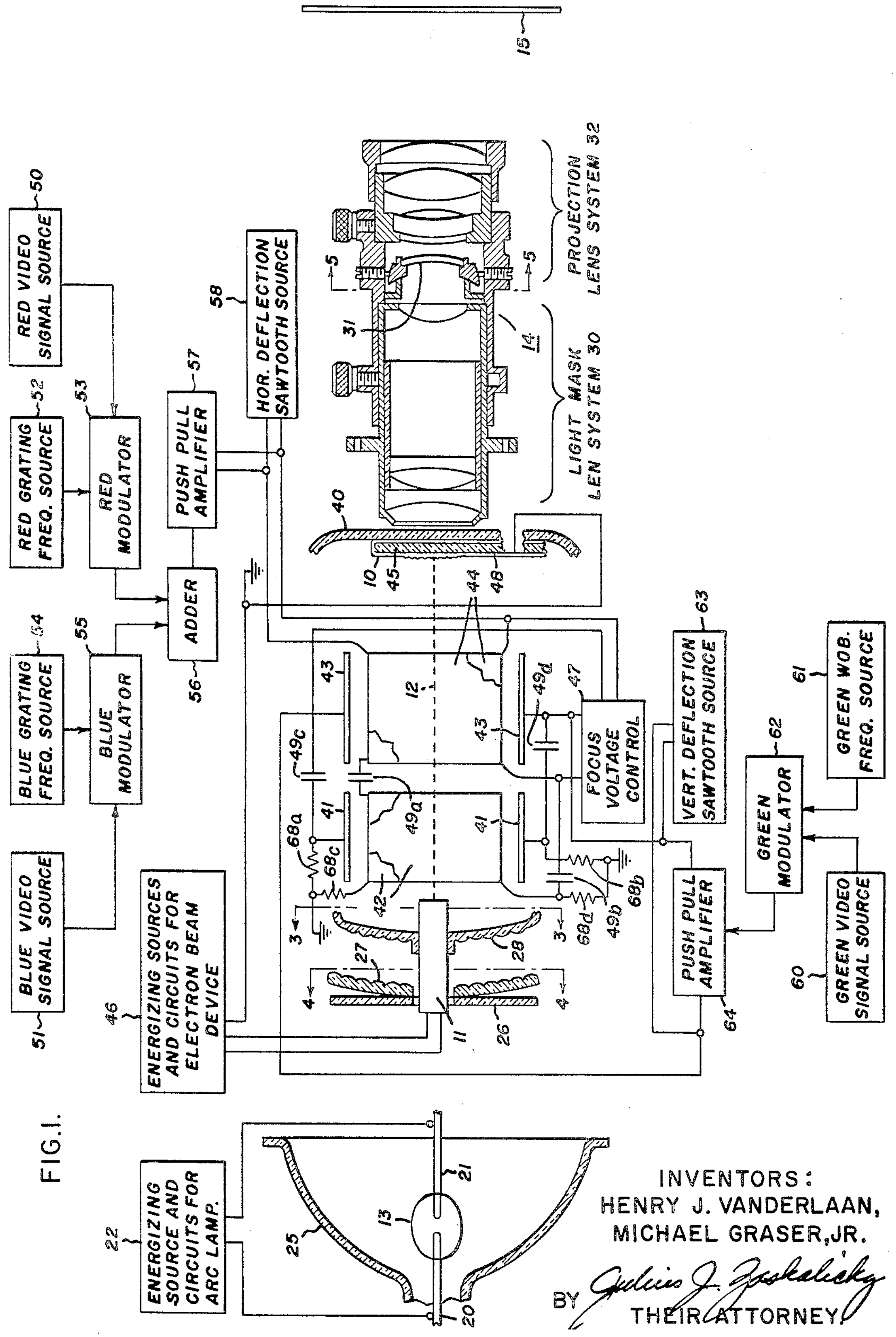
FIGURE 1 is a schematic diagram of the optical and electrical elements of a system useful in explaining the present invention.

Referring now to FIGURE 1 there is shown a simultaneous color pojection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured light mask and projection lens systems 14 which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of a voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticles on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. With the arrangement described efficient utilization is made of light from the source, and also uniform distribution of light is produced on the light modulating medium. The filter member 26 is constituted on the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, and output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Ser. No. 316,606, filed Oct. 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,505, filed Jan. 8, 1964, and assigned to the assignee of the present invention.

According to present day color television standards in force in the United States an image to be projected by a television system is scanned by a light-to-electrical converter horizontally once every $\frac{1}{15735}$ of a second, and vertically at a rate of one field of alternate lines every one-sixtieth of a second. Corresponding, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2A:
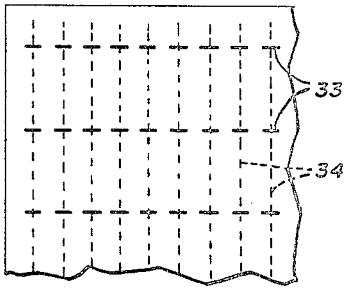
FIGURE 2 is a diagrammatic representation of the active area of the light modulating medium showing the horizontal scan lines and the location of charge with respect thereto for the various primary color channels of the system.
Figure 2B:

In FIGURE 2A is shown in schematic form a portion of such a raster in the light modulating medium along with the diffraction grating corresponding to the red color component. The size of the raster or whole area scanned in the embodiment is approximately 0.82 of an inch in height, and 1.10 of an inch in width. The horizontal dash lines 33 are the alternate scanning lines of the raster appearing in one of the two fields of a frame. The spaced vertically oriented dotted lines 34 of each of the raster lines, i.e., extending across the raster lines schematically represent concentrations of charge laid down by an electron beam to form the red diffraction grating in a manner to be described hereinafter, such concentrations occuring at equally spaced intervals on each line, corresponding parts of each scanning line having similar concentrations thereby forming a series of lines of charge equally spaced from adjacent lines which cause the formation of valleys in the light modulating medium, the depth of such valleys, of course, depending upon the concentration of charge. Such a wave is produced by a signal superimposed on an electron beam moving horizontally at a frequency 15,735 cycles per second, a carrier wave, of smaller amplitude but of fixed frequency of the order of 16 megacycles per second thereby producing a line-to-line spacing in the grating of approximately 1/760 of an inch. The high frequency carrier wave causes a velocity modulation of the beam thereby causing the beam to move in steps, and hence to lay down the pattern of charge schematically depicted in this figure with each valley extending in the vertical direction and adjacent valleys being spaced apart by a distance determined by the carrier frequency as shown in greater detail in FIGURE 2B which is a side view of FIGURE 2A.

Figure 2C:
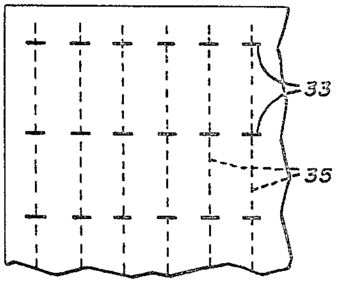
Figure 2D:
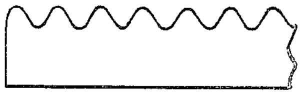

In FIGURE 2C is shown a section of the raster on which a blue diffraction grating has been formed. As in the case of the red diffraction grating, the vertically oriented dotted lines 35 of each of the electron beam scan lines 33 represent concentrations of charge laid down by the electron beam. The grating line to line spacing is uniform, and the amplitude thereof varies in accordance with the amount of charge present. The blue grating is formed in a manner similar to the manner of formation of the red grating, i.e., a carrier frequency amplitude smaller than the horizontal deflection wave is applied to produce a velocity modulating in the horizontal direction of the electron beam, at that frequency rate, thereby to lay down charges on each line that are uniformly spaced with the line to line spacing being a function of the frequency. A suitable frequency is nominally 12 megacycles per second. In FIGURE 2D is shown a side view of the section of the light modulating medium showing the deformations produced in the medium in response to the aforementioned lines of charge.

Figure 2E:
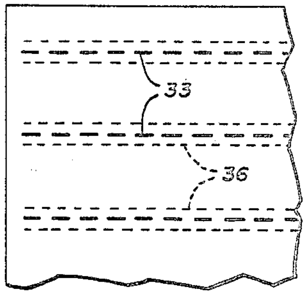
Figure 2F:
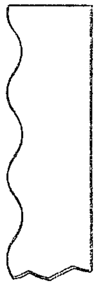

In FIGURE 2E is shown a section of the raster of the light modulating medium on which the green diffraction grating has been formed. In this figure are shown the alternate scanning lines 33 of a frame or adjacent lines of a field. On each side of the scanning lines are shown dotted lines 36 schematically representing concentrations of charge extending in the direction of the scanning lines to form a diffraction grating having lines or valleys extending in the horizontal direction. The green diffraction grating is controlled by modulating the electron scanning beam at very high frequency, nominally 48 megacycles in the vertical direction, i.e., perpendicular to the direction of the lines, to produce a uniform spreading out or smearing of the charge transverse to the scanning direction of the beam, the amplitude of the smear in such direction varying proportionately with the amplitude of the high frequency carrier signal, which amplitude varies inversely with the amplitude of the green video signal. The frequency chosen is higher than either the red or blue carrier frequency to avoid the undesired interaction with signals of other frequencies of the system including the video signals and the red and blue carrier waves, as will be more fully explained below. With low modulation of the carrier wave more charge is concentrated in a line along the center of the scanning direction than with high modulation thereby producing a greater deformation in the light modulating medium at that part of the line. In short, the natural grating formed by the focussed beam represents maximum green modulation or light field, and the defocussing by the high frequency modulation deteriorates or smears such grating in accordance with the amplitude of such modulation. For good dark field the grating is virtually wiped out. FIGURE 2F is a sectional view of the light modulating medium of FIGURE 2E showing the manner in which the concentrations of charge along the adjacent lines of a field function to deform the light modulating medium into a series of valleys and peaks representing a phase diffraction grating.

Thus FIGURE 2 depicts the manner in which a single electron beam scanning the raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus by applying the three signals indicated, each simultaneously varying in amplitude in accordance with the intensities of a respective primary color component of the image to be projected, three primary diffraction gratings are formed, the point by point amplitude of which vary with the intensity of a respective color component.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W. E. Glenn, Jr. assigned to the same assignee as the present invention.

When a pair of phase diffraction gratings such as those described are simultaneously formed and superimposed in a light modulating medium, inherently another diffraction grating, referred to as the beat frequency grating, is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence such light is blocked by the output mask having apertures set up on the basis of considerations outlined in the previous paragraph. Such blockage represents impairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point by point the relative intensity of each of three primary color components in a beam of light, inevitably two of the phase gratings must be formed in a manner to have lines or valleys, or components thereof, extending in the same direction. The manner in which such effects can be avoided are described and claimed in the aforementioned copending patent application, Ser. No. 343,-990, filed Feb. 11, 1964, and assigned to the assignee of the present invention.

Referring again to FIGURE 1 an electron writing system is provided for producing the phase diffraction gratings in the light modulating medium, and comprises an evacuated enclosure 40 in which are included an electron beam device 11 having a cathode (not shown), a control electrode (not shown), and a first anode (not shown), a pair of vertical deflection plates 41, a pair of horizontal deflection plates 42, a set of vertical focus and deflection electrodes 43, a set of horizontal focus and deflection electrodes 44, and the light modulating medium 10. The cathode, control electrode, and first anode along with the transparent target electrode 48 supporting the light modulating medium 10 are energized from a source 46 to produce in the evacuated enclosure an electron beam that at the point of focussing on the light modulating medium is of small dimensions (of the order of a mil), and of low current (a few micro-amperes), and high voltage. Electrodes 41 and 42, connected to ground through respective high impedances 68*a*, 68*b*, 68*c*, and 68*d* provide a deflection and focus function, but are less sensitive to applied deflection voltages than electrodes 43 and 44. The electrodes 43 and 44 control both the focus and deflection of the electron beam in the light modulating medium in a manner to be more fully explained below.

A pair of carrier waves which produce the red and blue gratings, in addition to the horizontal deflection voltage are applied to the horizontal deflection plates 42. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The light modulating medium 10 is an oil of appropriate viscosity and of deformation decay characteristics on a transparent support member 45 coated with a transparent conductive layer adjacent the oil such as indium oxide. The electrical conductivity and viscosity of the light modulating medium is so constituted so that the amplitude of the diffraction gratings decay to a small value after each field of scan thereby permitting alternate variations in amplitude of the diffraction grating at the sixty cycle per second field scanning rate. The viscosity and other properties of the light modulating medium are selected such that the deposited charges produce the desired deformations in the surface. The conductive layer is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal plates 44. The output of horizontal deflection sawtooth source 58 is also applied to plates 44 and to plates 42 through capacitors 49*a* and 49*b*.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce a deflection of the electron beam in the manner previously indicated. The output of vertical deflection sawtooth source 63 is also applied to plates 43 and to plates 41 through capacitors 49*c* and 49*d*.

A circuit for accomplishing the deflection and focusing functions described above in conjunction with deflection and focusing electrode system comprising two sets of four electrodes such as shown in FIGURE 1 is shown and described in a copending patent application Ser. No. 335,117, filed Jan. 2, 1964, and assigned to the assignee of the present invention. An alternative electrode system and associated circuit for accomplishing the deflection and focusing function is described in the aforementioned copending patent application, Ser. No. 343,990.

As mentioned above the red and blue channels make use of the vertical slots and bars and the green channel makes use of the horizontal slots and bars. The width of the slots and bars, in one arrangement or array is one set of values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of slots in the horizontal array is made three-fourths the center-to-center spacing of the slots in the vertical array. Each of the lenticules in each of the lenticular plates are also so proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figures 3, 4, 5:
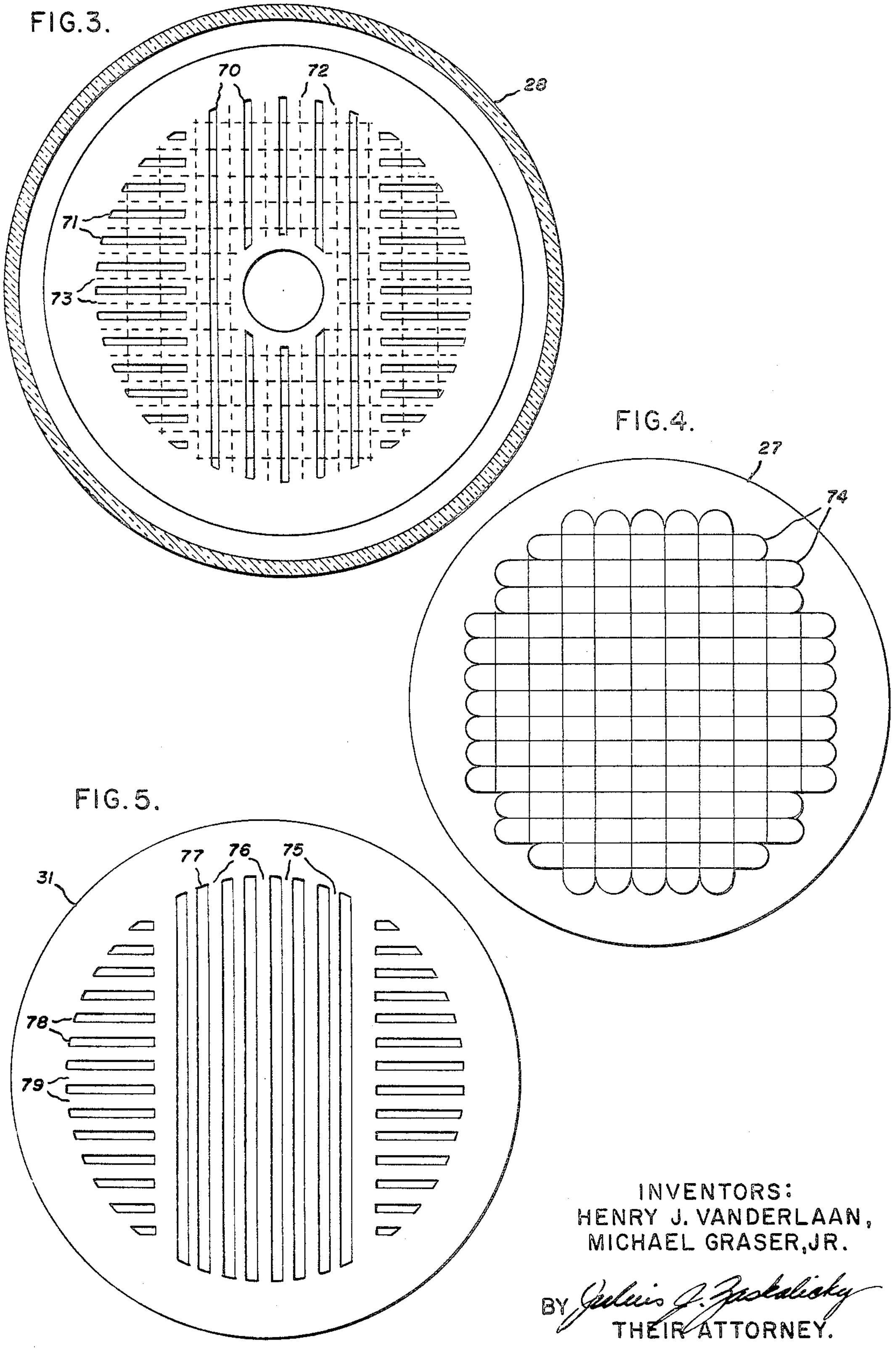
FIGURE 3 is an end view taken along section 3—3 of the system of FIGURE 1 showing the second lenticular lens plate and the input mask thereof in accordance with the present invention.
FIGURE 4 is an end view taken along section 4—4 of the system of FIGURE 1 showing the first lenticular lens plate thereof.
FIGURE 5 is an end view taken along section 5—5 of the system of FIGURE 1 showing the light output mask thereof in accordance with the present invention.

In FIGURE 3 is shown a view of the face of the second lenticular lens plate and input mask 28 as seen from the raster area of the modulating medium. The vertical oriented slots 70 located in a vertically extending central section of the input mask are utilized in controlling the red and blue light color components in the image to be projected. The horizontally extending slots 71 located in segments in the input mask on each side of the central portion thereof are utilized in controlling the green color component in the image to be projected. The ratio of the center-to-center spacing of the horizontal slots 71 to the center-to-center spacing of the vertical slots 70 is the normal three to four aspect ratio, such as utilized in the system set forth in the aforementioned patent application Ser. No. 365,751. The rectangular areas enclosed by the vertical and horizontal dash lines 72 and 73 are the boundaries for the individual lenticules appearing on the opposite face of the plate 28. The focal length of each of the lenticules is the same. The center of each of the lenticules associated with the vertical slots lies in the center of an element of a corresponding slot. Similarly the center of each of the lenticules associated with the horizontal slots lies in the center of a corresponding slot. Use of large lenticules of identical size and focal length simplifies the manufacture thereof and improves the performance of the system.

FIGURE 4 shows the first lenticular lens plate 27 taken along section 4—4 of FIGURE 1 with horizontal rows and vertical columns of lenticules 74. Each of the lenticules on this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

FIGURE 5 shows the light output mask 31 of FIGURE 1 taken along section 5—5 thereof and enlarged for reasons of clarity. The mask consists of a set of narrow opaque bars 75 interleaved with a set of wide opaque bars 76 to form a plurality of transparent slots 77 of substantially equal width in a central vertically extending section of the mask, and a plurality of slots 78 and opaque bars 79 in each of two sections on each side of the central portion thereof. The wide vertical output bars correspond in number to the vertical input slots in the input mask 28. Each vertical input slot is imaged on a respective wide vertical output bar in the absence of deformations in the light modulating medium. The number of horizontal bars in each side of the side sections of the output mask correspond to the number of horizontal slots in the side sections of the input mask. In the absence of deformation in the light modulating medium each of the horizontal input slots is imaged on a corresponding horizontal output bar of the side sections. Each of the bars and slots of the side section of the output mask is made twice as large as the arrangement described in the aforementioned patent application Ser. No. 365,751, and is more particularly described in patent application Ser. No. 381,634, assigned to the assignee of the present invention to improve the resolution of the green channel. The provision of an output mask such as shown in FIGURE 5 enables lenticules of twice the size as used in patent application Ser. No. 365,751 to be used with resultant simplification in the manufacture thereof and also resultant improved operation in the system. The manner in which the wide and narrow opaque bars in the central vertically extending section of the output mask functions to increase the efficiency and improve the resolution of the system without affecting color selection as between red and blue colors in that channel will be more fully described in connection with FIGURES 9A through 9C.

Figure 6:
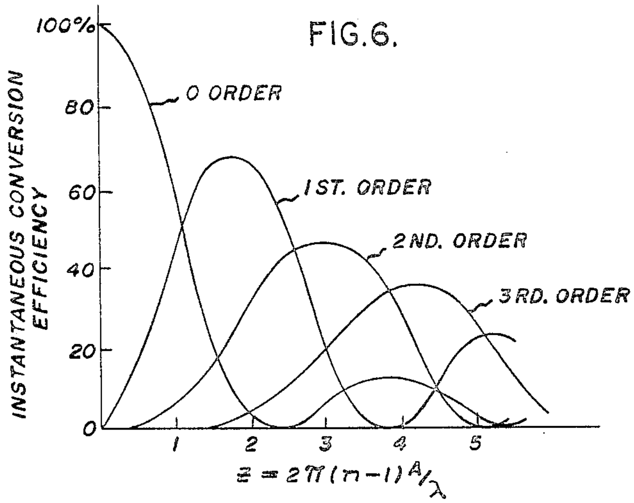
FIGURE 6 shows graphs of the instantaneous conversion efficiency of the light diffracting gratings formed in the light modulating medium as a function of the depth of modulation or deformation for various diffraction orders.

Referring now to FIGURE 6 there are shown graphs of the instantaneous conversion efficiency of the light diffracting grating formed in the light modulating medium as a function of the depth of modulation or deformation of the light modulating medium for various diffraction orders. In this figure instantaneous conversion efficiency for light directed on to the light modulating medium is plotted along the ordinate in percent and the deformation function Z, where $$Z=2\pi(\eta-1)\frac{A}{\lambda}$$

is plotted along the abscissa. In the above relationship A represents peak to peak amplitude or depth of deformation, $\lambda$ represents the wavelength of light involved and $\eta$ represents the index of the light modulating medium. Graphs 80, 81, 82, and 83 shows such relationships for the zero, the first, the second, and the third orders of diffracted light, respectively. In connection with this figure it is readily observed that when the light modulating medium is undeformed that all of the light is concentrated in the zero order which represents the undiffracted path of the light. Of course, the light passing through the light modulating medium would be deviated slightly by refraction of the light modulating medium as normally the index of refraction of the light modulating medium is different from the index of refraction of vacuum or air surrounding the medium, and is conveniently selected to be approximately in the range of refraction indices of the material of the various vitreous optical elements utilized in the system. The output mask is positioned in relationship to the input mask such that when the light modulating medium is undeformed the slots of the input mask are imaged on the bars of the output mask and thus the slight refraction effects that occur are allowed for. As the graph of modulation for a given grating is increased, progressively more light appears in the various diffraction orders higher than the zero order. Progressively as the peak efficiency of the first, second and higher orders of light is reached the value of the maximum efficiency of the higher order of light becomes progressively smaller. As can be readily seen from the graphs the maximum efficiences of light in the first order, second and third orders is approximately 67 percent, 47 percent, and 37 percent, respectively.

Figure 7:
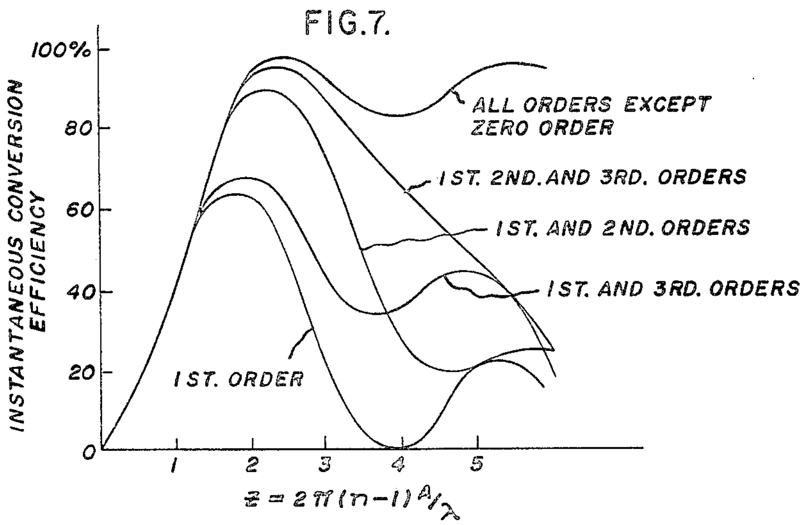
FIGURE 7 shows graphs of the instantaneous conversion efficiency of the light diffracting gratings formed in the light modulating medium as a function of the depth of modulation or deformation for various combinations of diffraction orders.

In FIGURE 7 are shown graphs of the instantaneous conversion efficiency versus Z, the function of the depth of modulation set forth above, for various combinations of diffraction orders. In this figure instantaneous conversion efficiency is plotted in percent along the ordinate, and the parameter Z is plotted along the abscissa. Graph 85 shows the manner in which the instantaneous conversion efficiency of the first order increases when the depth of modulation reaches a peak at approximately 67 percent and thereafter declines. Graph 86 shows the manner in which the instantaneous conversion efficiency for the sum of the first and second orders of diffracted light increases reaching a peak at approximately 93% and thereafter declines. Similarly, graph 87 shows the manner in which the instantaneous conversion efficiency of the diffraction grating varies for the sum of the first and third orders increases reaches a peak at approximately 69% and thereafter declines. Finally, graph 88 shows the manner in which the instantaneous conversion efficiency of the sum of the first, second and third orders of light increases to a peak of approximately 98% and thereafter declines. Graph 89 shows instantaneous conversion efficiency of the sum of all orders except the zero order.

Figure 8:
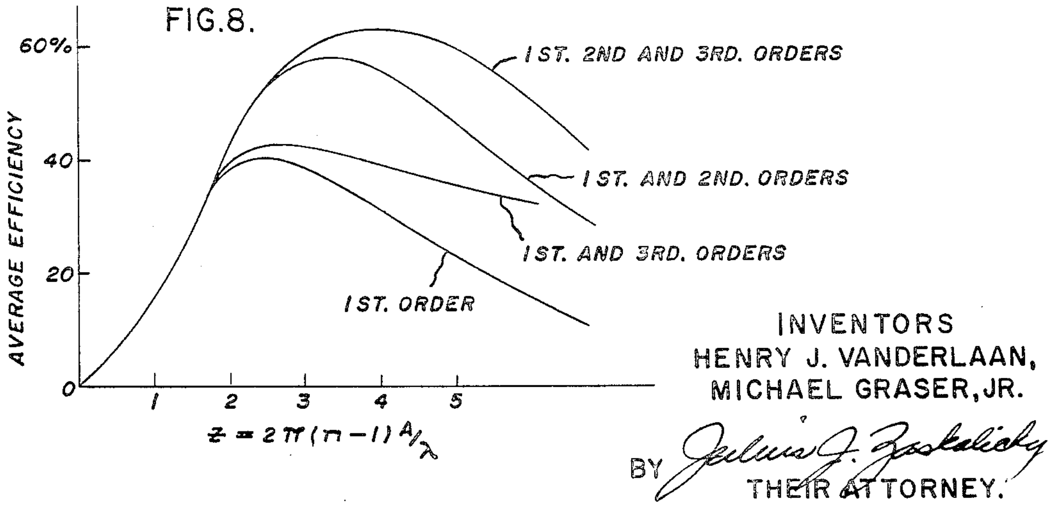
FIGURE 8 shows graphs of the average efficiency for linear decay of the light diffraction gratings formed in the light modulating medium as a function of the depth of modulation or deformation for various combinations of diffraction orders.

In FIGURE 8 are shown a group of graphs on the average conversion efficiency for the various combinations of diffraction orders as a function of the amplitude of deformation. The average conversion efficiency is represented in percent along the ordinate, and amplitude in terms of the aforementioned parameter Z is plotted along the abscissa. For the proper operation of the system of FIGURE 1 it is necessary for the light modulating medium to retain the diffraction deformations produced therein over a period comparable to the period of a scanning field. Ideally, each point of the light modulating medium should retain the deformation unattenuated until it is subject to a new deformation in response to the modulating signal. Practically, such an ideal situation cannot be met as the charge on the light modulating medium decays and thereby permits the diffraction patterns in the light modulating medium to decay. Under such practical conditions it is desirable for the deformations to decay to a small value over the period of a field of the television scanning process so that new deformation information can be applied to the light modulating medium. The average efficiency graphs of FIGURE 8 are based on the decay of the deformations to approximately one-third their initial value over the period of a field. Accordingly, even after the electron charge has been deposited by the electron beam to produce the deformation the existence of the deformation continues to diffract the light incident on the medium. Graphs 90, 91, 92, and 93 show, respectively, the average efficiency of the first diffraction order, the sum of the first and second orders, the sum of the first and third orders, and the sum of the first, second and third orders.

Figures 9A, 9B, 9C, 9D:
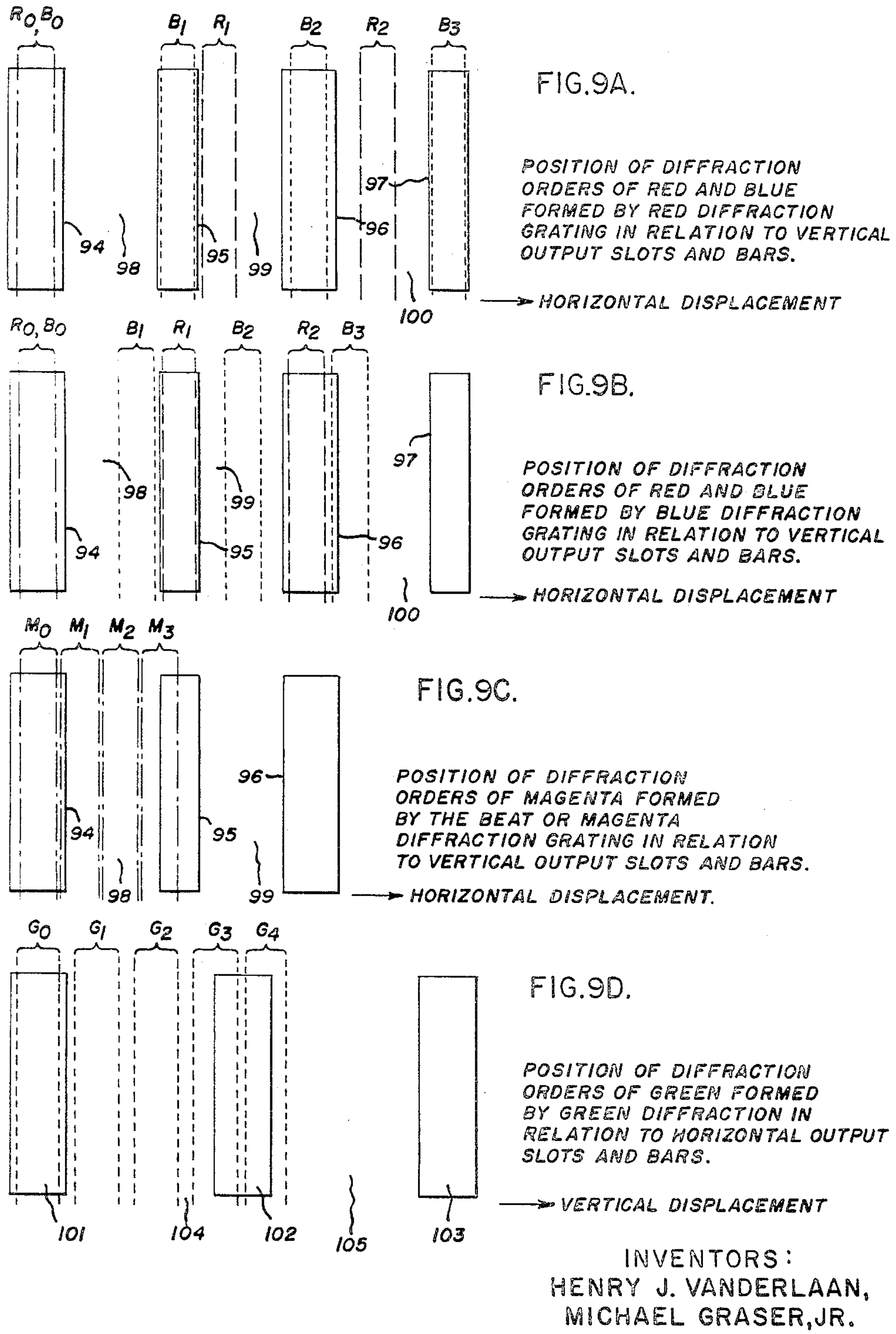
FIGURE 9A shows a diagram of the central section including the vertical slots and bars of the output mask of FIGURE 5 on which are superimposed various blocks representing various diffraction orders of two of the primary color components of light for the longer wavelength or red grating.
FIGURE 9B shows a diagram similar to the diagram of FIGURE 9A for the grating utilized for controlling the shorter wavelength or blue primary color component.
FIGURE 9C shows a diagram similar to the diagrams of FIGURES 9A and 9B showing the manner in which the beat grating formed in the light modulating medium by the beating of the red and blue grating diffracts the magenta light.
FIGURE 9D shows a diagram of a portion of a side section of segment including the horizontal slots and bars of the output mask of FIGURE 5 on which is superimposed various blocks representing various diffraction orders of the green primary color component by the green grating.

Referring now to FIGURE 9A there is shown a portion of the bars and slots of the central section of the output mask 31 of FIGURES 1 and 5. Conveniently, two wide bars 94 and 96, and two narrow bars 95 and 97 interleaved therewith to form three slots 98, 99, and 100 are shown. More particularly, this figure illustrates where the various diffraction orders of red and blue light fall in relationship to the vertical bars and slots of the output mask. The horizontal coordinate of the diagram represents the horizontal displacement of the various orders of the red and blue primary colors in relationship to the slots and bars in the output mask. The color component is designated by an appropriate literal symbol, R for red, and B for blue. The diffraction is indicated by the appropriate numerical subscript. As mentioned above, the light from a particular slot in the input mask in the absence of modulation in the light modulating medium falls on a particular wide bar in the output mask. Such a condition is represented by the lines bracketed $B_0$, $R_0$, where the separation of such lines bears a definite relationship to the width of the slot source of member 28 of FIGURE 3. As the longer wavelengths of light are deviated more by a diffraction grating of fixed line to line spacing, the first order image of red light $R_1$, is deviated more than the first order image of blue light $B_1$, as shown in the figure. Also, the progressively higher orders of diffracted light are deviated progressively more by the factor of the order of that light. Thus the second order red component is deviated twice the amount of deviation of first order red component, and similarly the second order of blue light is deviated twice the amount of the first order of blue light, and so on. What has been said for the various primary color components is also true for the wavelengths in that primary color component, i.e., the long wavelengths of red light are deviated more than the short wavelengths of the red light, for example. Accordingly, the spacial spread of the image of the source is progressively greater for higher orders and also for longer wavelengths. Thus the source, which has a particular width in the zero order image, has progressively greater widths in the higher order images, the amount of increase depending not only on the order but also on the color component. The increased widths, for reasons of clarity, have not been shown in FIGURE 9A, and in FIGURES 9B, 9C, and 9D, as well.

The line to line spacing of the red diffraction grating, the line to line spacing of the blue diffraction grating, the nominal or central wavelength of red light, the nominal or central wavelength of blue light used in the system are particularly related in a manner to be more fully described below. By nominal wavelength of a primary color is meant a centrally chosen wavelength in the spectrum of wavelengths of that color as utilized in the system. Such nominal or central wavelength would represent the dominant wavelentgh of a primary color impinging on the light modulating medium. As all of the wavelengths in a primary color component are not equally transmitted by the optical elements on the output side of the light modulating medium, the dominant wavelengths of primary colors projected on the screen would be different from the dominant wavelengths of the primary color impinging on the light modulating medium; however, even so such dominant wavelengths are close to the central or nominal wavelengths as defined above. Typically, the nominal wavelengths for the blue color component may be 465 millimicrons and the nominal wavelengths for the red primary color may be 620 millimicrons.

For the purpose of explaining the invention the ratio of the line to line spacing for the blue primary color diffraction grating to the line to line spacing of the red primary color diffraction grating is selected to be substantially equal to the ratio of the nominal wavelengths of red light to the nominal wavelength of blue light. For the typical values mentioned above this ratio is equal to 1.33. With such a ratio of the line to line spacing of the blue primary grating to the line to line spacing of the red primary gratings, the vertical bars of the output mask are positioned to block the various orders of blue light diffracted by the red diffraction grating allowing only the red light to come through; first, second, and third order of components of blue light fall on the first, second, and third bars 95, 96 and 97, respectively, removed from bar 94 on which zero order light falls, and first order red light falls in the second slot 99 removed from the zero order bar 94 and second order red light falls on the third slot 100 removed from the zero order bar 94.

In FIGURE 9B is shown the distribution of the various orders of red and blue light over the output mask for the blue or shorter wavelength primary component diffraction grating formed in the manner described above. In this figure there is shown the same system of bars and slots, and so designated, as shown in FIGURE 9A. The horizontal coordinate in this figure also represents the horizontal displacement of various orders of the red and blue primary components in relation to the slots and bars in the output mask. As the line to line spacing of the blue grating is greater, the various orders of diffracted light are deviated less as determined by the relationship of the line to line spacing of the red diffraction grating to the line to line spacing of the blue diffraction grating. Zero order lights $R_0$, $B_0$ is unaffected. First order blue light $B_1$, however, now falls substantially in the first slot 98 removed from the zero order bar, and second order blue light $B_2$, and third order blue light $B_3$ fall, respectively, in the second slot 99 and third slot 100 removed from the zero order bar 94. First order red light $R_1$ and second order red light $R_2$ now fall on the first bar 95 and second bar 96 removed from the zero order bar 94. It should also be noted that fourth order blue light $B_4$, and third order red light $R_3$ fall on the third bar 97 removed from the zero order bar 94. As bars 95 and 97 do not have input slot sources imaged thereon they need be made only wide enough to block first and third order blue light and first and third orders of red light. Bars 94 and 96 are made appreciably wider than bars 95 and 97, e.g., 25 percent wider to provide a guard band to block light deviated by relatively large area changes in the thickness of the light modulating medium as well as to enable good efficiency and good color selection to be obtained.

Thus, even though red light in addition to blue light falls on the blue diffraction grating, the system of bars and slots in accordance with the present invention blocks the red light and passes only the blue light. In the system illustrated the first, second, and third orders of blue diffracted by the blue grating are passed and the first and second order of red light diffracted by the red grating are passed. From FIGURES 7 and 8 it will be readily seen that, with such a system in which the maximum modulation of the light modulating medium corresponds to a depth near the depth where maximum efficiency is obtained, that high efficiency is obtained for both the red and blue components of light and good color selection, i.e., purity of the two colors is maintained, as well is obtained. With the use of narrow output bars interleaved with bars of normal width, the slots of the output mask can be made quite wide without compromising purity in the various color passed yet at the same time permitting a higher proportion of diffracted light to pass than would otherwise be the case. Such increase in the width of an output vertical slot enables higher resolution to be obtained in the projected image.

The appearance of two direction gratings of different line to line spacing but having lines similarly oriented in the same area of the light modulating medium gives rise to a third diffraction grating the line to line spacing of which is determined by the difference in the two frequencies which were utilized in forming the corresponding primary gratings. The frequency of the two modulating signals are selected such that the difference frequency is less than either of the modulating frequencies. The grating produced by the beating of the other two gratings, as it has a line to line spacing larger than the other two gratings, will produce a deviation in the various order of diffracted light which is less than the deviation produced by the other two gratings, the amount of such deviation depending upon the line to line spacing of that grating, and of course the wavelength of light.

FIGURE 9C illustrates where the various orders of red and blue or magenta light from the beat grating fall in relation to the output slots and bars. In this figure the same portion of the central portion of the light output mask is shown with the same bars and slots, and so designated, as appears in FIGURES 9A and 9B. In FIGURE 9C the red and blue light are collectively designated by the letter M for magenta, and the various orders are designated by the appropriate numerical symbol. As in the case of FIGURES 9A and 9B zero order magenta $M_0$ falls on the zero order bar 94. First order magenta light $M_1$, second order magenta light $M_2$ and third order magenta light $M_3$ fall in the first slot 98 removed from the zero order bar 94. With the increased width provided in slot 98 a large portion of third order magenta is passed with resultant larger overally efficiency of passage of magenta light.

FIGURE 9D shows a portion of one of the side sections of the output mask of FIGURES 1 and 5 in which is included several bars 101, 102, and 103 separated by successive slots 104 and 105. The horizontal coordinate represents the vertical displacement of the various orders of green light denoted $G_0$, $G_1$, $G_2$, $G_3$, and $G_4$ in relation to the slots and bars. In this figure one-half as many bars are utilized as in the arrangement described in patent application Ser. No. 365,751. However, the bars are made essentially twice as wide and allowing for guard bands in the bars with the result that the transparency is essentially the same or may be even greater than the total transparency of the side sections of an output mask such as in prior art arrangement. In this system first order green light $G_1$ falls in slot 104, second order green light $G_2$ also falls in slot 104, and a major portion of third order green light is blocked by bar 102. Thus such an arrangement for the green channel is not only highly efficient but also provides better resolution of the green image therein.

While the invention has been described in connection with a system in which the line to line spacing of the shorter wavelength primary color component to the line to line spacing of the grating of the longer wavelength primary color component is in the relationship of 4 to 3, it will be appreciated that the invention is equally applicable to other systems using other ratios, for example the ratios mentioned in patent application Ser. No. 343,-990, filed Feb. 11, 1964, and assigned to the assignee of the present invention.

While in the output mask of FIGURE 5, and as shown in more detail in FIGURE 9A, a single narrow bar, for example, bar 95, is included between successive wide bars, for example bars 94 and 96, it will be appreciated that bars 94 and 97 could be made wide bars and bars 95 and 96 made narrow bars, i.e., two narrow bars included between successive wide bars. Of course, the slots of the input mask would be arranged so that such light from such slots would be imaged only on the wide bars.

In patent application Serial No. 419,396, filed Dec. 18, 1964, and now Patent No. 3,308,230, and assigned to the assignee of the present invention there is disclosed a system for the projection of monochrome images in which gratings oriented in the direction perpendicular to the lines of the electron beam is utilized. In that patent application is disclosed a system in which the grating lines are selected with respect to a system particularly constructed for color projection which enables optimum efficiency to be obtained in monochrome projection. In such a system first and second orders of diffracted light are utilized. To obtain such first and second order diffracted light a relatively low frequency horizontal scan modulating frequency is utilized to produce a grating sufficiently coarse to enable first and second order diffracted light to pass through the fine sets of slots and bars associated with the vertical or red and blue primary color channels of the color system. In such systems gratings are of such coarseness as to be visible in the projected image. In the system in accordance with the present invention as the lenticules are twice as large as the aforementioned system, and as the center to center spacing of the input slots associated with the red and blue primary channels are twice as large, zero image blocking bars in the input mask are similarly spaced twice as large. Accordingly, when it is desired to use such vertical channel for black and white projection such can be accomplished by substituting in such channel an output slot and bar system the same as in the aforementioned system with the narrow bars eliminated. The filter 26 is removed and also the side segment of course of the input mask containing the horizontal slots is blocked. With such a system a frequency twice as large may be utilized thus avoiding the aforementioned deterioration in the projected monochrome image as well as providing a highly efficient system.

While the invention has been described in specific embodiments, it will be appreciated that many modifications may be made by those skilled in the art, and we intend by the appended claims to cover all such modifications and changes as fall within the true spirit and scope of the invention.

We claim:

1. A system for simultaneously controlling point by point the intensity of each of a pair of primary color components in a beam of light in response to respective electrical signals comprising:

a light modulating medium, means for directing said beam on said light modulating medium, means for simultaneously producing two sets of deformation in said medium, the deformations in each set being arranged in uniformly spaced similarly directed lines to form respective light diffraction gratings, the lines in each set extending in the same direction, one of said diffraction gratings having a line to line spacing smaller than the other of said gratings, means for controlling the amplitude of the lines of deformation of said one grating in response to the one of said electrical signals corresponding to the one of said color components of longer wavelengths, means for controlling the amplitude of lines of deformation of the other of said gratings in response to the other of said electrical signals, a light mask including a set of transparent slots of equal width interleaved with a set of wide and narrow opaque bars, said narrow opaque bars being of appreciably less width than said wide opaque bars and interleaved therewith, each of said slots being successively positioned in a line orthogonal to said lines of deformation, each of said slots being oriented parallel to said lines of deformation and disposed in the path of light coming from said light modulating medium, means for imaging light from said source through said light modulating medium on said wide bars in the absence of deformation in said medium.

2. A system for simultaneously controlling point by point the intensity of each of a pair of primary color components in a beam of light in response to respective electrical signals comprising:

a light modulating medium, means for directing said beam on said light modulating medium, means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings, means for controlling the amplitude of the lines of deformation of said one grating in response to the one of said electrical signals corresponding to the one of said color components of longer wavelengths, means for controlling the amplitude of lines of deformation of the other of said gratings in response to the other of said electrical signals, a light mask including a set of transparent slots of equal width interleaved with a set of wide and narrow opaque bars, said narrow opaque bars being of appreciably less width than said wide opaque bars and arranged so that two narrow bars are included between successive wide bars, each of said slots being successively positioned in a line orthogonal to said lines of deformation, each of said slots being oriented parallel to said lines of deformation and disposed in the path of light coming from said light modulating medium, means for imaging light from said source through said light modulating medium on said wide bars in the absence of deformation in said medium.

3. A system for simultaneously controlling point by point the intensity of each of a pair of primary color components in a beam of light in response to respective electrical signals comprising:

a light modulating medium, means for directing said beam on said light modulating medium, means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings, said sets of deformations forming a third diffraction grating of line to line spacing which is uniform and greater than the line to line spacing of either of said other gratings, means for controlling the amplitude of the lines of deformation of said one grating in response to the one of said electrical signals corresponding to the one of said color components of longer wavelengths, means for controlling the amplitude of lines of deformation of the other of said gratings in response to the other of said electrical signals, a light mask including a set of three wide bars interleaved with two narrow bars to form a set of two slots on each side of the central one of said wide bars, each of said slots being of the same width, said narrow opaque bars being of appreciably less width than said wide opaque bars, each of said slots being successively positioned in a line orthogonal to said lines of deformation, each of said slots being oriented parallel to said lines of deformation and disposed in the path of light coming from said light modulating medium, means for imaging light from said light modulating medium on said central wide bars in the absence of deformations in said medium, the slots adjacent said central bar being positioned and of extent in the direction of deviation to pass first and second order light of said color component diffracted by said third grating and to pass first order light of said other color components diffracted by said other grating, the other slots being positioned and of extent in the direction of deviation to pass first order light of said one color component diffracted by said one grating and second order light of said other component diffracted by said other grating, 4. A system for simultaneously controlling point by point the intensity of each of a pair of primary color components in a beam of light in response to respective electrical signals comprising:

a light modulating medium, means for directing said beam on said light modulating medium, means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings, said sets of deformations forming a third diffraction grating of line to line spacing which is uniform and greater than the line to line spacing of either of said other gratings, means for controlling the amplitude of the lines of deformation of said one grating in response to the one of said electrical signals corresponding to the one of said color components of longer wavelengths, means for controlling the amplitude of lines of deformation of the other of said gratings in response to the other of said electrical signals, a light mask including a set of three wide bars interleaved with four narrow bars to form a set of three slots on each side of the central one of said wide bars, each of said slots being of the same width, said narrow opaque bars being of appreciably less width than said wide opaque bars, each of said slots being successively positioned in a line orthogonal to said lines of deformation, each of said slots being oriented parallel to said lines of deformation and disposed in the path of light coming from said light modulating medium, means for imaging light from said light modulating on said central bar in the absence of deformation in said medium, the slots adjacent said central bar being positioned and of extent in the direction of deviation to pass first and second order light of said color components diffracted by said third grating and to pass first order light of said other color component diffracted by said other grating, the next ones of said slots adjacent said central bar being positioned and of extent in the direction of deviation to pass first order light of said one color component diffracted by said one grating and second order light of said other component diffracted by said other grating, the ones of said slots remote from said central bar being positioned and of extent in the direction of deviation to pass substantially second order light of said one color component diffracted by said one grating.

5. A system for simultaneously controlling point by point the intensity of each of a pair of primary color components consisting of red and blue in a beam of light in response to respective electrical signals comprising:

a light modulating medium, means for directing said beam on said light modulating medium, means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings, said sets of deformations forming a third diffraction grating of line to line spacing which is uniform and greater than the line to line spacing of either of said other gratings, means for controlling the amplitude of the lines of deformation of said one grating in response to the one of said electrical signals corresponding to the red primary color component, means for controlling the amplitude of lines of deformation of the other of said gratings in response to the other of said electrical signals, a light mask including a set of three wide bars interleaved with four narrow bars to form a set of three slots on each side of the central one of said wide bars, each of said slots being of the same width, said narrow opaque bars being of appreciably less width than said wide opaque bars, each of asid slots being successively positioned in a line orthogonal to said lines of deformation, each of said slots being oriented parallel to said lines of deformation and disposed in the path of light coming from said light modulating medium, means for imaging light from said light modulating medium on said central bar in the absence of deformation in said medium, the slots adjacent said central bar being positioned and of extent in the direction of deviation to pass first and second order light of said color components diffracted by said third grating and to pass first order light of said blue color component diffracted by said other grating, the next ones of said slots adjacent said central bar being positioned and of extent in the direction of deviation to pass first order light of said one color component diffracted by said one grating and second order light of said other component diffracted by said other grating, the ones of said slots remote from said central bar being positioned and of extent in the direction of deviation to pass substantially second order light of said one color component diffracted by said one grating.

6. An optical projection system for projecting an image in red and blue in accordance with information contained in respective light diffraction gratings having lines oriented in one direction in a light modulating medium comprising:

a source of light for producing said red and blue color components of light, a first light mask interposed between said source and said light modulating medium including a set of transparent slots of equal width interleaved with a set of bars of equal width, said transparent slots and opaque bars extending in said one direction, a second light mask including a set of transparent slots of equal width interleaved with a set of wide and narrow opaque bars, said narrow opaque bars being of appreciably less width than said wide opaque bars and interleaved therewith each of said slots being successively positioned in a line orthogonal to said lines of deformation, each of said slots being oriented parallel to said lines of deformation, and disposed in the path of light coming from said light modulating medium, means for imaging magenta light from said source through said slots of said first mask on said light modulating medium including an array of converging lenticules arranged in columns and rows in side by side relationship, successive columns of lenticules associated with said slots in said first mask, means for imaging light from each successive slot in said first mask onto respective successive wide bars in said second mask in the absence of any deformations in said medium, said first and second light masks constituted and positioned with respect to said orthogonally arranged diffraction gratings of said light modulating medium to control therewith the intensity of each of said red and blue color components projected by said other projection means.

7. An optical projection system for simultaneously projecting an image in green in accordance with information contained in a horizontally oriented light diffraction grating and in magneta in accordance with information contained in a vertically oriented light diffraction grating in a light modulating medium comprising:

a source of light for producing said green and magenta color components of light, a first light mask interposed between said source and said light modulating medium including a first set of transparent slots of equal width interleaved with a set of bars of equal width, said transparent slots and opaque bars extending in said vertical direction, and a second set of horizontally extending opaque bars of equal width and transparent slots of equal width, said first set of opaque bars and transparent slots contained in one area of said first mask and said second set of bars and slots contained in the remaining area of said first mask, a second light mask including a first set of transparent slots of equal width interleaved with a set of wide and narrow opaque bars, said narrow opaque bars being of appreciably less width than said wide opaque bars and interleaved therewith each of said slots being successively positioned horizontally to said lines, each of said slots being oriented vertically, and disposed in the path of light coming from said light modulating medium, and a second set of horizontally extending opaque bars and transparent slots.

said first set of opaque bars and slots contained in one area of said second light mask and said second set of opaque bars and transparent slots contained in the remaining area of said second mask, said one area of said light masks being similar in outline and in axial registry and said remaining areas of said light masks being similar in outline and in axial registry, means for imaging magenta light said source through said first set of slots of said first mask and for imaging green light from said source through said second set of slots of said first mask on said light modulating medium including an array of converging lenticules arranged in columns and rows in side by side relationship, each of said lenticules having the same focal length and the same aspect ratio as said image, successive columns of lenticules associated with successive slots in said one area of said first mask oriented in the direction of the columns, successive rows of lenticules associated with respective successive slots in said remaining area of said first mask oriented in the direction of the rows, projection means for projecting light from the transparent slots in said one area of said first mask onto the corresponding wide opaque portions in said one area of said mask in the absence of any deformations in said medium, and for projecting light from the transparent slots in said remaining area of said first mask onto corresponding opaque portions in said remaining area of said second mask in the absence of any deformations in said medium, another projection means for projecting an image of said medium on a screen, said first and second light masks constituted and positioned with respect to said orthogonally arranged diffraction gratings of said light modulating medium to control conjointly therewith the intensity of each of said green and magenta color components projected by said one other projection means.

No references cited.

JEWELL H. PEDERSEN, *Primary Examiner.*

W. L. SIKES, *Assistant Examiner.*